Sept. 8, 1931.     E. F. ZAPARKA     1,822,187
CONTROLLING DEVICE FOR VEHICLE SPRING SUSPENSION SYSTEMS
Filed March 30, 1929
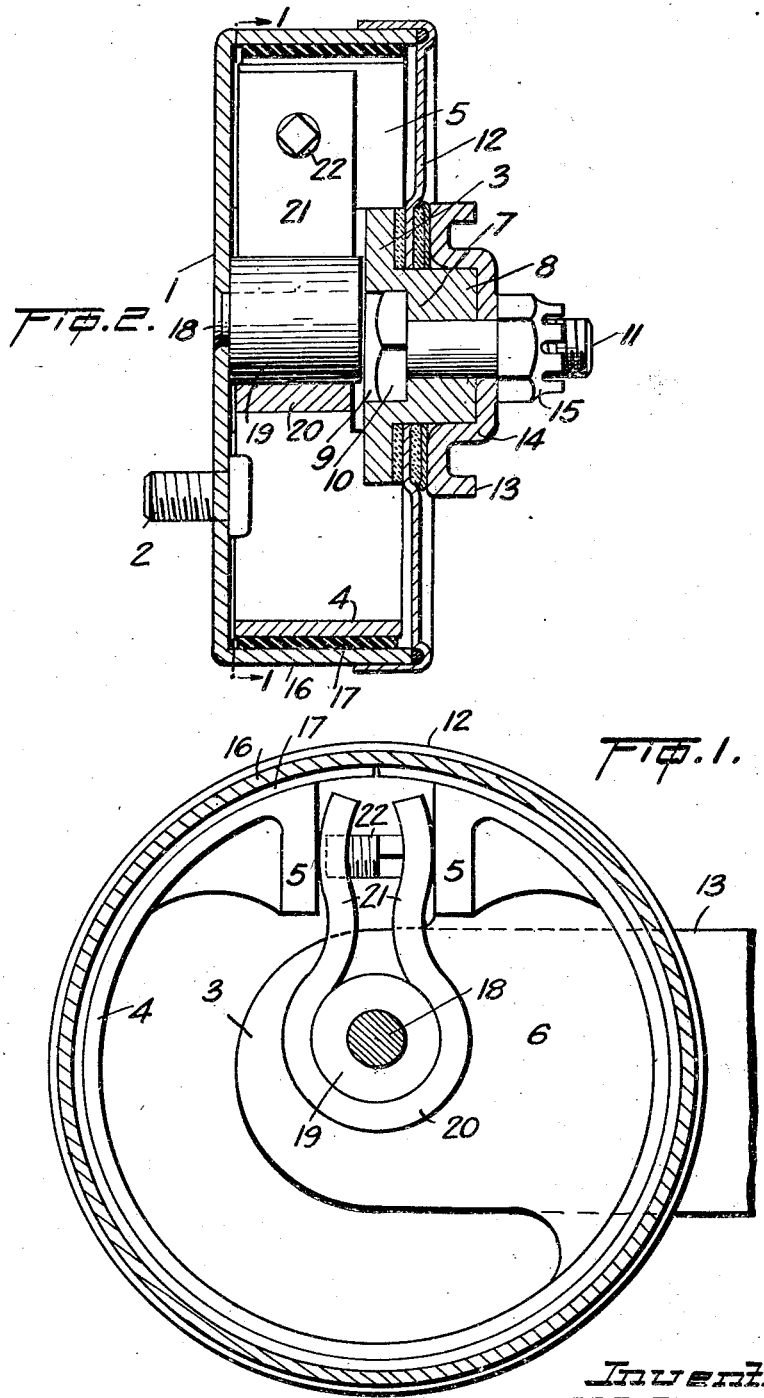

Patented Sept. 8, 1931

1,822,187

UNITED STATES PATENT OFFICE

EDWARD F. ZAPARKA, OF NEW YORK, N. Y., ASSIGNOR TO LEOPARD AUTOMOBILE PRODUCTS CORPORATION, OF NEW YORK, N. Y., A CORPORATION

CONTROLLING DEVICE FOR VEHICLE SPRING SUSPENSION SYSTEMS

Application filed March 30, 1929. Serial No. 351,324.

My invention relates to improvements in controlling devices for vehicle spring suspension systems, particularly of the friction type, and the object of the invention is to devise an improved means for applying pressure of one friction element upon another frictional element so that frictional resistance is offered to the movement of an axle of a vehicle away from its normal axial line with an accelerating rate of gain and a release of such frictional resistance with an accelerated rate of loss to the movement of such axle back to its normal position.

A further object is to construct a device fulfilling the above conditions which will be exceedingly simple and which will include a very small number of parts.

My invention consists of a device constructed and arranged, all as hereinafter more particularly described and illustrated in the accompanying drawings in which:

Fig. 1 is a vertical section through my invention taken in the line 1—1 Fig. 2, and Fig. 2 is a vertical cross sectional view thereof.

Like characters of reference indicate corresponding parts in the different views.

In the preferred form, my invention comprises a drum 1 adapted to be attached to any suitable part of the chassis, such as a frame side member (not shown) by the bolts 2. Inserted into the drum 1 is a split band assembly consisting of the central portion 3 and the split friction band 4 with spaced apart ends or abutments 5. The central portion 3 is preferably secured to or formed integrally with one end of the band 4 through the medium of an arm 6 so that such band end will be rigidly supported, whereas the other end is free to expand. In the preferred embodiment shown, the supporting arm 6 for the split friction band is united with the latter at a point offset from the circumferential center of the band. This supporting connection may be adjacent to one end 5 of the split band, as shown. This arrangement provides a relatively long end section of the friction band opposite to the supported end thereof whereby a servo effect is attained. That is, the frictional resistance due to the rotation of the band in counter-clockwise direction as viewed in Fig. 1, will be less than during the rotation in a clockwise direction because in the latter direction the long free end of the band 4 tends to tighten against the wall of the friction drum, thus giving rise to the so-called servo effect which is desirable in checking return movements of the vehicle axle after the movements thereof toward the vehicle body.

The central portion 3 is provided with a forwardly protruding hollow central boss 7 with a squared outer extremity 8 and an inner rectangular socket 9 into which is inserted the square head 10 of a bolt 11. The boss 7 extends freely through the cover 12 of the drum 1 and the bolt 11 protrudes from its outer end.

An actuating lever 13 with a squared socket portion 14 is applied to the boss, said extremity 8 being inserted into the socket portion 14 and held in place by a nut 15 threaded onto the outer end of the bolt 11.

The bolt 11 is positioned concentrically with the drum 1 and the band 4. Interposed between the band 4 and the annular wall 16 of the drum may be inserted a friction lining 17.

A stud 18 secured to the drum protrudes forwardly into the interior thereof, said stud being offset from the axis of rotation of the band 4 as is clearly shown in the drawings, said stud 18 having freely mounted thereon a cylindrical bushing 19 upon which in turn is freely mounted the substantially cylindrical end 20 of an applicator lever. Such lever may be constructed of appropriate material, as, for instance, spring metal and such cylindrical end 20 is extended to constitute two spaced apart spring arms 21 which engage the ends or abutments 5 of the band 4. Normally the arms 21 would tend to close together but are held in their spaced apart relation by means of a set screw 22 which is threaded into one of the arms. The distance between such arms can thus be varied at will to vary the initial pressure exerted by the band 4 upon the annular wall 16 of the drum.

The actuating lever 13 is attached to the axle (not shown) in any suitable way, for instance as depicted in my co-pending application Serial No. 324,480 filed December 7th, 1928, so that the actuating lever will be swung in the desired direction upon movement of the axle moving above and below its normal axial line.

With the form of band as illustrated in the drawings when the axle moves towards the chassis the band 4 will be moved in a counter-clockwise direction. Consequently the applicator lever will be swung to the left about its own centre, i. e. the axis of the stud 18, which is offset from the axis of the band. Thus the applicator lever will spread the ends of the band 4 apart and cause such band to exert pressure on the drum wall 16 or lining 17 where such is used. Since, as mentioned, the stud 18 is eccentrically positioned being offset upwardly as viewed in Fig. 1, the rotary movement of the applicator lever will be faster than that of the friction band 4. In other words, the angular displacement of this lever at any moment will be greater than that of the friction band assembly. Thus frictional resistance with an accelerating rate of gain will be offered to the movement of the axle towards the chassis as, within limits, the greater amount the applicator is displaced the greater will be the pressure of the band upon the drum owing to the applicator being mounted eccentrically to the axis of the band.

As the band is moved back towards its normal position by the actuating lever, upon the axle moving back to its normal axial line, the pressure of the band upon the drum will be gradually decreased and consequently the frictional resistance to the movement of such axle back to normal will be released with an accelerating rate of loss.

When the axle moves below the normal axial position the band will be turned clockwise swinging the applicator lever to the right and again pressure will be applied by the band upon the drum at an accelerated rate as stated above. Return of the axle to normal will cause such band to move back to normal in a counter-clockwise direction and the applicator lever will be restored to its normal position with a release of the pressure of the band upon the drum as above.

What I claim as my invention is:

1. In a controlling device for vehicle suspension systems, in combination, a plurality of concentric friction elements mounted for relative oscillatory rotary movement, means for varying the diameter of one friction element upon relative rotary movements of said elements, said means including an applicator lever having spaced adjustable spring arms and a supporting pivot pin for said applicator lever mounted eccentrically to the axis of said friction elements.

2. In a controlling device for vehicle suspension systems, in combination, a plurality of concentric friction elements mounted for relative oscillatory rotary movement, one of said friction elements including a split friction band having an operating support displaced from its circumferential center, means for varying the diameter of said split friction band upon relative rotary movement of said elements, said means including an applicator lever having spaced adjustable spring arms positioned between the ends of said split band, and a supporting pivot pin for said applicator lever mounted eccentrically to the axis of said friction elements.

3. In a controlling device for vehicle suspension systems, in combination, a plurality of concentric friction elements mounted for relative oscillatory rotary movement, one of said friction elements including a split friction band having an operating support displaced from its circumferential center, means for varying the diameter of said split friction band upon relative rotary movement of said elements, said means including an applicator lever having spaced adjustable spring arms positioned between the ends of said split band, a supporting pivot pin for said applicator lever mounted eccentrically to the axis of said friction elements, and an adjusting screw positioned between said spring arms for varying the initial frictional pressure between said friction elements.

4. In a controlling device for vehicle suspension systems, in combination, a plurality of concentric friction elements mounted for relative oscillatory rotary movement, one of said friction elements including a split friction band, a rotary hub having an operating lever connected thereto, a supporting connection between said hub and said split friction band and connected nearer to one end of the latter than to the other end thereof, means for varying the diameter of said split friction band, said means including an applicator lever having spaced adjustable spring arms interposed between the ends of said split friction band, and a supporting pivot pin for said applicator lever mounted eccentrically to the axis of said friction elements.

EDWARD F. ZAPARKA.